(12) United States Patent
Shelstad (10) Patent No.: US 12,529,193 B2
(45) Date of Patent: Jan. 20, 2026

(54) SENSOR SYSTEM

(71) Applicant: MOBA Mobile Automation AG, Limburg (DE)

(72) Inventor: David Shelstad, Peachtree City, GA (US)

(73) Assignee: MOBA Mobile Automation AG, Limburg (DE)

( * ) Notice: Subject to any disclaimer, the term of this patent is extended or adjusted under 35 U.S.C. 154(b) by 0 days.

(21) Appl. No.: 18/774,667

(22) Filed: Jul. 16, 2024

(65) Prior Publication Data

US 2025/0027278 A1     Jan. 23, 2025

(30) Foreign Application Priority Data

Jul. 17, 2023   (EP) ................................. 23185833

(51) Int. Cl.
*G01S 17/88* (2006.01)
*E01C 19/00* (2006.01)

(52) U.S. Cl.
CPC ............ *E01C 19/006* (2013.01); *G01S 17/88* (2013.01)

(58) Field of Classification Search
CPC combination set(s) only.
See application file for complete search history.

(56) References Cited

U.S. PATENT DOCUMENTS

| | | |
|---|---|---|
| 3,334,560 A | 8/1967 | Long et al. |
| 3,908,765 A | 9/1975 | Hawkins |
| 4,647,784 A | 3/1987 | Stephens |
| 5,327,345 A | 7/1994 | Nielsen et al. |
| 5,356,238 A | 10/1994 | Musil et al. |
| 5,393,167 A | 2/1995 | Fujita et al. |
| 5,401,115 A | 3/1995 | Musil et al. |
| 5,430,651 A | 7/1995 | Nielsen et al. |
| 5,484,227 A | 1/1996 | Ikeda et al. |
| 5,546,123 A | 8/1996 | Ikeda et al. |

(Continued)

FOREIGN PATENT DOCUMENTS

| | | |
|---|---|---|
| CA | 2832956 C | 11/2016 |
| CN | 1743552 A | 3/2006 |

(Continued)

OTHER PUBLICATIONS

Fischer Connectors SA, Fischer FreedomTM Series, Easy Mating, Easy Cleaning, Easy Integration, Version 1.2. Aug. 2019. 2 pages.

(Continued)

*Primary Examiner* — Brodie J Follman
(74) *Attorney, Agent, or Firm* — PERKINS COIE LLP; Michael A. Glenn (57) ABSTRACT

Sensor system for a construction machine, especially a road construction machine or paving machine, including: an optical detector which is arrangeable on the construction machine and configured to scan the underground in a predetermined angle so as to obtain measurement data describing one or more intensity values and/or one or more distance values plotted over the predetermined angle and a processor which is configured to analyse the measurement data so as to determine a pattern of intensity values and/or distance values in accordance with a predetermined pattern out of one or more predetermined patterns.

12 Claims, 6 Drawing Sheets

(56) References Cited

U.S. PATENT DOCUMENTS

| | | |
|---|---|---|
| 5,721,685 A | 2/1998 | Holland et al. |
| 5,975,473 A | 11/1999 | Haas et al. |
| 5,984,420 A | 11/1999 | Murray et al. |
| 6,287,048 B1 | 9/2001 | Hollon et al. |
| 6,729,596 B2 | 5/2004 | Fumado |
| 7,172,363 B2 | 2/2007 | Olson et al. |
| 7,344,380 B2 | 3/2008 | Neidlein et al. |
| 8,132,935 B2 | 3/2012 | Park et al. |
| 8,371,769 B2 | 2/2013 | Worsley et al. |
| 8,794,868 B2 | 8/2014 | Fritz |
| 8,944,719 B2 | 2/2015 | Frelich et al. |
| 9,033,611 B2 | 5/2015 | Hanfland et al. |
| 9,529,087 B2 * | 12/2016 | Stainvas Olshansky et al. ........... G01S 17/89 |
| 9,587,737 B2 | 3/2017 | Bartl |
| 9,587,937 B2 | 3/2017 | Buschmann et al. |
| 9,609,780 B2 | 3/2017 | Eble et al. |
| 10,363,883 B2 | 7/2019 | Herzberg |
| 11,885,881 B2 * | 1/2024 | Horn .................. G01S 7/4802 |
| 2004/0068896 A1 | 4/2004 | Sehr |
| 2006/0045620 A1 | 3/2006 | Olson et al. |
| 2006/0051981 A1 | 3/2006 | Neidlein et al. |
| 2008/0050965 A1 | 2/2008 | Szelag et al. |
| 2009/0226255 A1 | 9/2009 | Lossow |
| 2012/0170228 A1 | 7/2012 | Lai et al. |
| 2012/0321384 A1 | 12/2012 | Hanfland et al. |
| 2014/0342577 A1 | 11/2014 | De Bruijn |
| 2015/0115181 A1 | 4/2015 | Eble et al. |
| 2017/0044726 A1 | 2/2017 | Buschmann et al. |
| 2017/0160094 A1 | 6/2017 | Zhang et al. |
| 2017/0292230 A1 | 10/2017 | Herzberg |
| 2018/0164829 A1 | 6/2018 | Oshima et al. |
| 2018/0237999 A1 | 8/2018 | Højland et al. |
| 2019/0119865 A1 | 4/2019 | Weber et al. |
| 2019/0136467 A1 | 5/2019 | Laugwitz |
| 2021/0181354 A1 | 6/2021 | Becher et al. |
| 2021/0318440 A1 | 10/2021 | Impola et al. |
| 2023/0004744 A1 | 1/2023 | Pfeiffer et al. |

FOREIGN PATENT DOCUMENTS

| | | |
|---|---|---|
| CN | 101145653 A | 3/2008 |
| CN | 201660836 U | 12/2010 |
| CN | 201770931 U | 3/2011 |
| CN | 102828457 A | 12/2012 |
| CN | 103492967 A | 1/2014 |
| CN | 103797659 A | 5/2014 |
| CN | 106522065 A | 3/2017 |
| CN | 108235712 A | 6/2018 |
| CN | 109356005 A | 2/2019 |
| CN | 112945293 A | 6/2021 |
| CN | 113152215 A | 7/2021 |
| DE | 4204481 A1 | 10/1992 |
| DE | 29723171 U1 | 4/1998 |
| DE | 69411794 T2 | 8/1998 |
| DE | 19755324 A1 | 6/1999 |
| DE | 19951296 A1 | 6/2001 |
| DE | 10060903 A1 | 7/2002 |
| DE | 10138563 A1 | 2/2003 |
| DE | 10234217 A1 | 2/2004 |
| DE | 102005040326 A1 | 4/2006 |
| DE | 102011113752 A1 | 3/2013 |
| DE | 102011119272 A1 | 5/2013 |
| DE | 102015008315 A1 | 1/2017 |
| DE | 102017010238 A1 | 5/2019 |
| EP | 0542297 A1 | 5/1993 |
| EP | 1118713 A1 | 7/2001 |
| EP | 1179636 A1 | 2/2002 |
| EP | 1537632 B1 | 1/2006 |
| EP | 2597321 A1 | 5/2013 |
| EP | 3133213 A1 | 2/2017 |
| EP | 3712328 A1 | 9/2020 |
| EP | 3955162 A1 | 2/2022 |
| JP | H02136405 A | 5/1990 |
| JP | H04179705 A | 6/1992 |
| JP | H0749642 B2 | 5/1995 |
| JP | 2013231354 A | 11/2013 |
| WO | 2012140191 A1 | 10/2012 |
| WO | 2020088782 A1 | 5/2020 |
| WO | 2021151511 A1 | 8/2021 |
| WO | 2022037764 A1 | 2/2022 |

OTHER PUBLICATIONS

Fischer Connectors, Fischer Freedom TM Series, K Chapter. 17 pages.

Rosenberger, RoPD® Connectors, Magnetic Connecting System—Power and Data Transmission for LEV. Germany. 2016. 6 pages.

Rosenberger, Technical Data RoPD® Cable Assemblies. 1 page.

Tf Paving Company, Mini-Line® EASY Averaging Beam, 11002303. 3 pages.

Tf Technologies Paving Innovation, Mini-Line® EASY Averaging Beam, Installation Manual. Sep. 5, 2018. 33 pages.

Tf Technologies Paving Innovation, Mini-Line® EASY Averaging Beam, v. H804606, 2 pages.

Tf Technologies Paving Innovation, Mini-Line® SUPER Averaging Beam, Installation Manual. Apr. 5, 2018. 37 pages.

Tf Technologies Paving Innovation, Mini-Line® Super Averaging Beam, TF Paving Academy, v. H812403, L1001905. 3 pages.

Topcon Laser Systems, Inc., SMOOTHTRACTM, Sonic Averaging Systems (SAS), Operation & Maintenance Manual, Cedarapids, A Terex Company, 22506 (11/2000). 20 pages.

Gourdon, et al., "Modelling and Controlling the Road Finishing Process", pp. 479-488. Bouguenais, France. 1990. 10 pages.

Rosenberger, RoPD®, https://www.rosenberger.com/de/produkt/ropd/. Jul. 4, 2022. 9 pages.

* cited by examiner

Fig. 1

Fig. 2a milling edge
≈70°

SENSOR SYSTEM

CROSS-REFERENCE TO RELATED APPLICATION

This application claims priority from European Patent Application No. EP 23 185 833.3, which was filed on Jul. 17, 2023, and is incorporated herein in its entirety by reference.

Embodiments of the present invention refer to a sensor system, especially to a sensor system for a construction machine, especially a road construction machine or paving machine. An embodiment refers to a corresponding method and computer program. Another embodiment refers to a construction machine comprising a sensor system.

BACKGROUND OF THE INVENTION

In general, embodiments of the present invention are in the field of measurement equipment, especially LiDAR or laser measurement equipment.

In construction machines LiDAR/laser sensors are used to detect and track a reference along which the paver (paving machine/road finishing machine) itself or equipment of the paver, like the screed, can be controlled. For example, the paver can be controlled with regard to its lateral dynamics by use of a reference which extends along the traveling direction. For example, a rope or stone edge curb extending along the traveling direction can be used as reference. The road finishing machine driver makes steering corrections (manually, or autonomously/semi-autonomously) in accordance with a specific reference, such that the road finishing machine travels as parallel as possible at the same distance from the reference. Automation of the entire steering process (tractor and plank/screed) would significantly reduce the workload of the road finishing machine's operation during asphalt paving. An exemplary approach is described in the WO 2020/088782 A1.

SUMMARY

According to an embodiment, a sensor system for a construction machine, especially a road construction machine or paving machine may have: optical detector which is arrangeable on the construction machine and configured to scan the underground in a predetermined angle to the side so as to obtain measurement data describing one or more intensity values and one or more distance values plotted over the predetermined angle; a processor which is configured to analyse the measurement data so as to determine a pattern of intensity values and distance values in accordance with a predetermined pattern out of more predetermined patterns; wherein the one or more predetermined patterns including a milling edge pattern characterized by two plateaus with a connection in between, wherein the connection is substantially perpendicular to the two plateaus or having an inclination angle within a range between 70° to 90°; and wherein the one or more predetermined pattern includes a paving edge pattern characterized by two plateaus having a connection in between, wherein the connection has an inclination angle of less than 70°; and wherein the one or more predetermined patterns include a curb stone edge pattern characterized by two plateaus having a connection in between or a substantially perpendicular connection in between, wherein one edge includes a roundness and/or wherein the spacing between the two edges is larger than 5 cm or 10 cm [approx.].

According to another embodiment, a construction machine, especially work construction machine or paving machine may have an inventive sensor system.

According to another embodiment, a method for performing a curb detection using a sensor system for a construction machine, especially a road construction machine or paving machine, may have the steps of: scanning the underground in a predetermined angle to the side so as to obtain measurement data describing one or more intensity values and one or more distance values plotted over the predetermined angles; analysing the measurement data so as to determine a pattern of intensity values and distance values in accordance with a predetermined pattern out of more predetermined patterns; wherein the one or more predetermined patterns including a milling edge pattern characterized by two plateaus with a connection in between, wherein the connection is substantially perpendicular to the two plateaus or having an inclination angle within a range between 70° to 90°; and wherein the one or more predetermined pattern includes a paving edge pattern characterized by two plateaus having a connection in between, wherein the connection has an inclination angle of less than 70°; and wherein the one or more predetermined patterns include a curb stone edge pattern characterized by two plateaus having a connection in between or a substantially perpendicular connection in between, wherein one edge includes a roundness and/or wherein the spacing between the two edges is larger than 5 cm or 10 cm [approx.].

Another embodiment may have a non-transitory digital storage medium having a computer program stored thereon to perform the inventive method when said computer program is run by a computer.

Embodiments of the present invention provide a sensor system for a construction machine, like a road construction machine or paving machine. The sensor system comprises an optical detector which is arrangeable on the construction machine and a processor. The detector is configured to scan the underground in a predetermined angle so as to obtain measurement data describing one or more intensity values and/or one or more distance values plotted over the predetermined angle range. The processor is configured to analyse the measurement data so as to determine a pattern of intensity values and/or distance values in accordance with a predetermined pattern out of one or more predetermined patterns.

For example, the pattern to be determined can be a milling edge pattern. This means that the one or more predetermined patterns comprising a milling edge pattern characterized by two plateaus with a connection in between. The connection might be substantially perpendicular or may have an inclination angle within a range between 70° to 90° or 70° to 100° or, in general, larger than 70° or advantageously larger than 80°.

According to further embodiments, a paving edge pattern may be determined. This means that according to embodiments the one or more predetermined patterns comprise a paving edge pattern characterized by two plateaus having a connection in between, wherein the connection has an inclination angle less than 70°.

According to further embodiments, the pattern may be the pattern of a curb stone edge. Thus, according to embodiments, the one or more predetermined patterns comprise the curb stone edge pattern characterized by two plateaus having a connection in between or a substantially perpendicular connection in between, wherein one edge comprises a roundness and/or wherein a spacing between the two edges is larger than 5 cm or 10 cm.

According to further embodiments there are the patterns for other kinds of edges which are known and stored as predetermined patterns. For example, the above mentioned predetermined patterns may be stored in a database being part of the sensor system or being connected to the processor of the sensor system.

According to embodiments, the optical detector is configured to scan the underground to be paved or paved across a traveling direction of the construction machine and/or angled by an angle arranged between 45° and 90° with respect to the traveling direction of the construction machine. According to embodiments, the optical detector is configured to scan the underground to be repaved or paved along a direction crossing the traveling direction of the construction machine and/or along a plurality of positions along the traveling direction of the construction machine. For example, the optical detector is arranged at the side of the paver so that it can scan the area sidewise to the construction machine. When the construction machine travels along the traveling direction the scanner performs the scanning, wherein due to the movement along the traveling direction a scan along the traveling direction is caused, while the scanner is configured to scan the predetermined angle to the side. The predetermined angle is predetermined by the optical sensor. In case the scanning plane is arranged perpendicular to the traveling direction or crosses a traveling direction a scanning across the traveling direction is possible.

According to embodiments, the optical detector comprises a LIDAR sensor and/or laser scanner.

According to embodiments, the controller is configured to set and/or determine a control point in relation to the pattern or a curb within the pattern or in relation to a user terminal spacing to the curb within the pattern.

According to embodiments, the processor is configured to determine the pattern within a plurality of measurement data (sets) to be determined along a traveling direction and/or during a plurality of subsequent points of time. Alternatively or additionally, the processor is configured to track a control point determined within the pattern along the traveling direction and/or along a plurality of measurements determined in a plurality of subsequent points of time.

According to embodiments, the processor is configured to perform a predetermination of one or more patterns during a teach in phase and/or during a training phase and/or during a training phase performed using artificial intelligence.

According to embodiments, the processor is configured to automatically determine a control point and/or a relation or lateral spacing to the control point or between the control point and the construction machine so as to output an information on the spacing or lateral spacing to the control point of the construction machine.

Another embodiment provides a construction machine, especially a road construction machine or paving machine comprising a sensor system according to embodiments of the present invention.

The construction machine may, according to further embodiments, comprise a controller for performing autonomous and/or semi-autonomous and/or automated controlling based on measurement data provided by the sensor system.

Another embodiment provides a method for performing curb detection. The method comprises the following steps:
scanning the underground in a predetermined angle so as to obtain measurement data describing one or more intensity values and/or one or more distance values plotted over the predetermined angles;
analysing the measurement data so as to determine a pattern of intensity values and/or distance values in accordance with a predetermined pattern out of one or more predetermined patterns.

Of course, the method may be computer implemented.

BRIEF DESCRIPTION OF THE DRAWINGS

Embodiments of the present invention will be detailed subsequently referring to the appended drawings, in which.

DETAILED DESCRIPTION OF THE INVENTION

Below, embodiments of the present invention will subsequently be discussed with the enclosed figures, wherein identical reference numbers are provided to objects having an identical or similar function, so that the description thereof is mutually applicable and obtainable.

Figure 1:
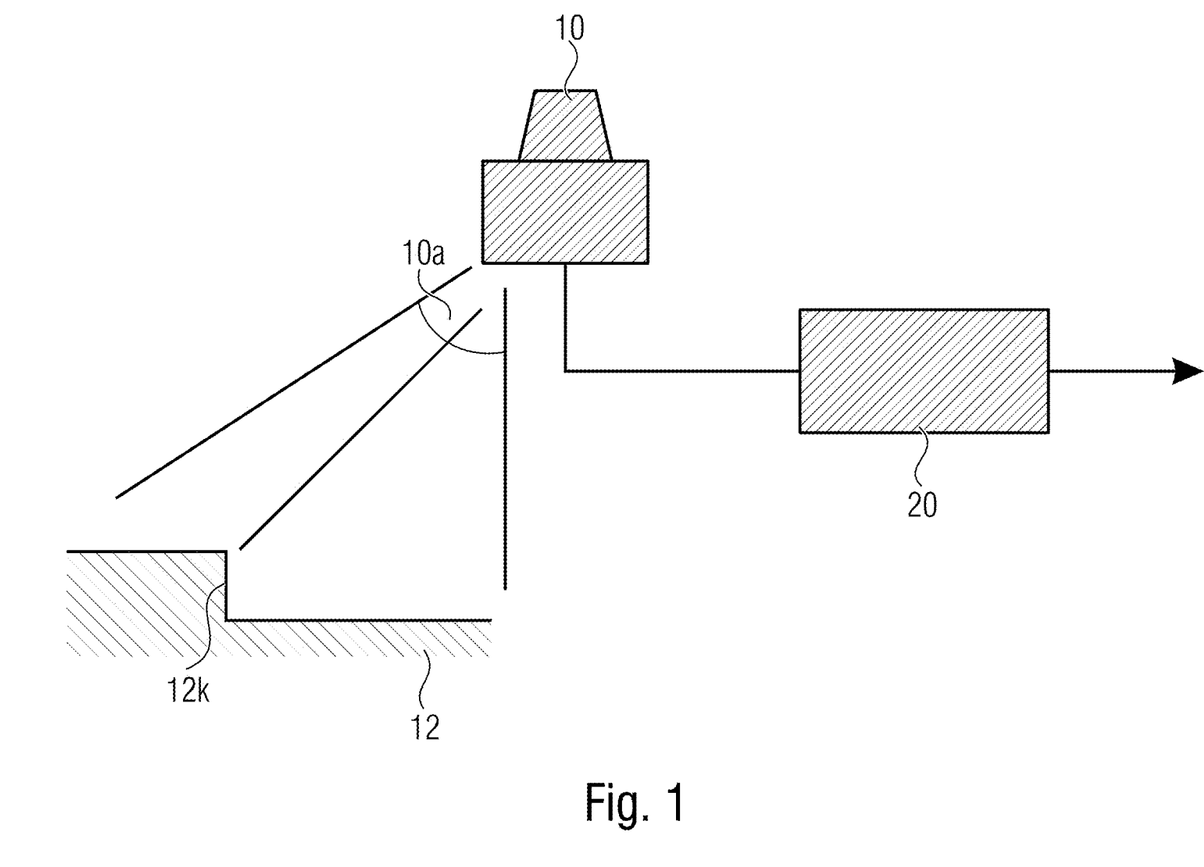
FIG. 1 shows schematically a measurement system according to embodiments.
Figure 3:
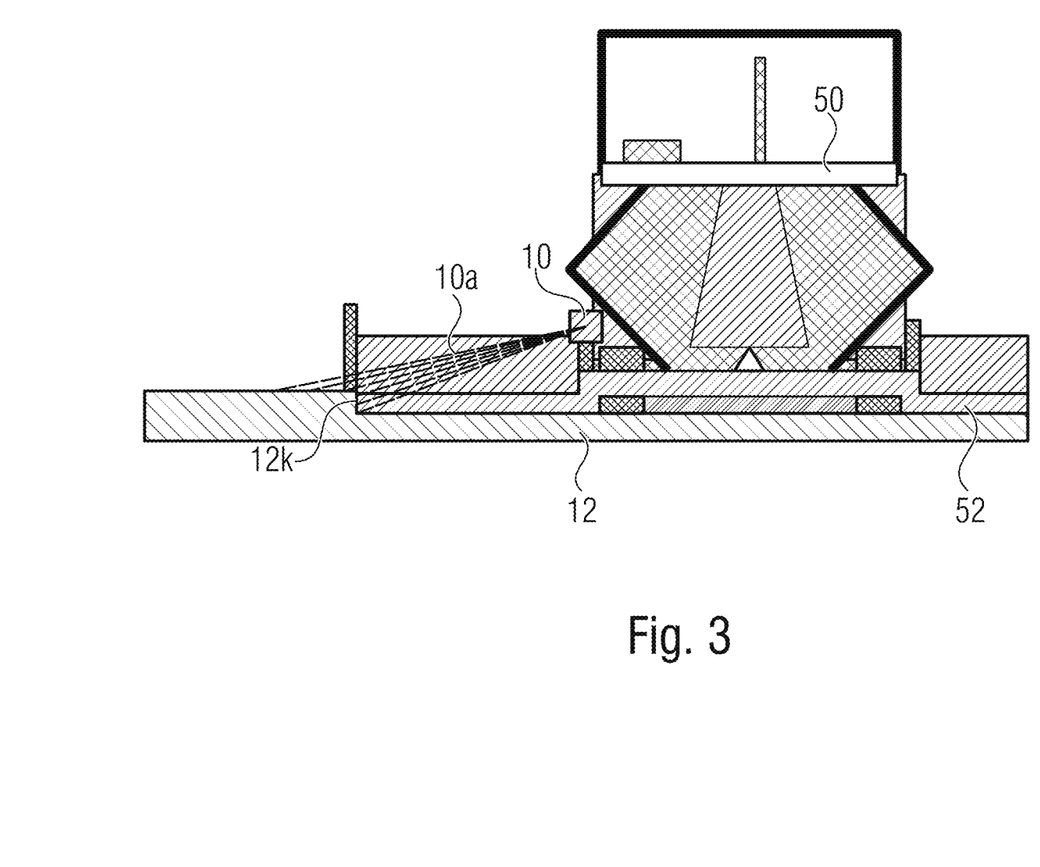
FIG. 3 shows schematically a position for a laser scanner to be attached to a road construction machine according to embodiments.

FIG. 1 shows an optical detector module 10 like a laser scanner, together with a processor 20. The optical detector 10 is arrangeable on a construction machine, like a road construction machine or paving machine 50 as is illustrated by FIG. 3. The optical detector 10 is configured to scan the underground 12 which comprises the edge 12k. The underground 12 is scanned within a predetermined range 10a so as to obtain measurement data. The measurement data comprises an information on a measured distance between the scanner 10 and the underground 12 plotted over the angles of the predetermined scan angle 10a. Additionally or alternatively, intensity values can be obtained. Here, the edge 12k causes a kind of discontinuity with respect to the distance values and/or intensity values. The height of the edge 12k and/or the flag angle are dependent on the type of curb. Vice versa, this means that different curbs 12k on or within the underground 12 cause different patterns within the measurement data. Such a pattern can be predetermined so that the measurement data can be compared with the one or more predetermined pattern so as to characterize the respective curb.

With respect to FIGS. 2a to 2e, five different predetermined patterns will be discussed which can be determined by the sensor system of FIG. 1. FIGS. 2a to 2e show different edge shapes.

Figure 2A:
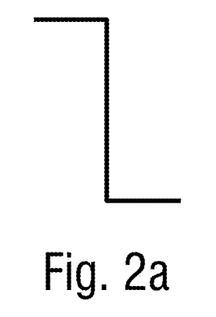
FIGS. 2a-2e shows schematically different patterns of edges to be determined according to embodiments.
Figure 2B:
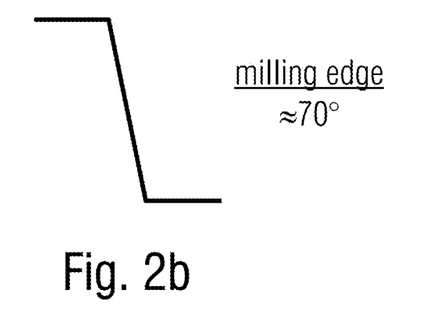

FIGS. 2a and 2b show two different milling edges, wherein the angle is in the range between 70° (cf. FIG. 2b) and 90° (cf. FIG. 2a). A scan of the two milling edges of 2a and 2b would result in a pattern having two plateaus with a perpendicular or steep slope in between. The angle can be 70° of the slope. This means that the angle between the plateau and the connection amounts to 90° to 110°. When scanning such an edge, the distance values as well as the intensity values would indicate this shape. The transition of the plateaus of FIGS. 2a and 2b comprises a kind of jump.

Figure 2C:
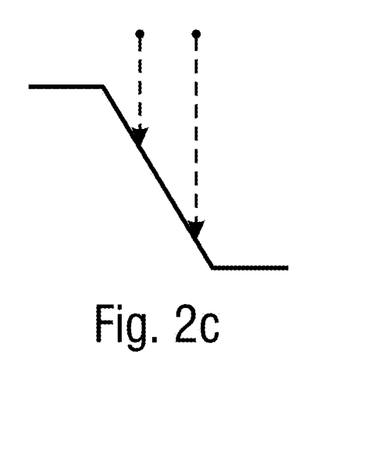
Figure 2D:
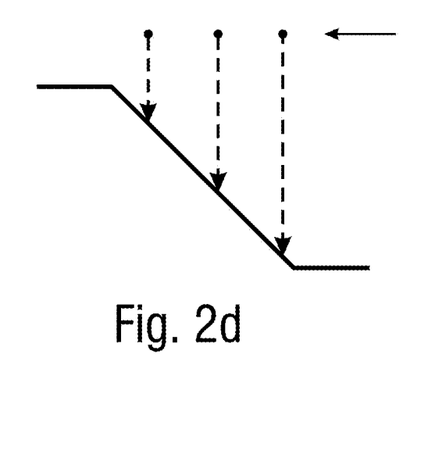

FIGS. 2c and 2d show two different edges, namely paving edges, where the slope is below 70°. Consequently, the angle between the two plateaus and the connection line is larger than 110°. Due to this the pattern comprises a "continuous" transition from the one plateau to the next plateau. The transition/slope is dependent on the shape of the sent element of the screed.

In FIGS. 2c to 2d scan directions for the case that the optical scanner is arranged above are shown. When the scanner has a bad view to the edge to be determined, the slope can be detected by use of the distance values and/or the intensity values. The distance values as well as intensity values have a specific pattern which can be predetermined and compared afterwards. In case the view to the edge has a digital component, the pattern is different. However, the characteristics are the same and, for optical sensors being arranged with a diagonal view, can also be predetermined.

Figure 2E:
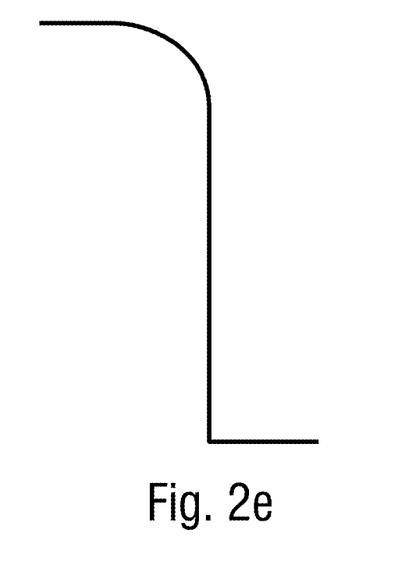

FIG. 2e shows another edge, namely a so-called curb stone edge. Here, also two plateaus with a connection in between are arranged wherein the connection is substantially larger when compared to the connection of the edge of FIG. 2a, 2b, 2c and/or 2d. Furthermore, the edge may have a rounding at the top plateau.

According to embodiments, the processor 20 comprises a database having stored thereon one or more predetermined patterns and is configured to analyse the measurement data detected using the sensor 10 by comparing the measurement data/pattern of distance values/intensity values within the measurement data with predetermined patterns so as to find out whether the determined pattern complies to a pattern being stored before.

With respect to FIG. 3 a potential position of the optical sensor 10 on the paving machine 50 will be discussed. The paving machine is configured to provide a pavement on the underground 12 by use of the screed 52. The underground 12 may comprise an edge 12k which can be determined by the optical sensor 10. The optical sensor 10 scans the underground 12 within a predetermined angle 10a so as to determine the edge 12k and the type of the edge. For this, the optical detector 10 is arranged on the side, e.g., on the screed 52 or a side blade of the screed 52 and focused on the underground 12. Here, the measurement angle is approximately 100° with respect to the traveling direction. Also, the predetermined angle α of the sensor 10 in this embodiment is not arranged as a bird view perpendicular to the ground but slightly inclined, e.g., by 45° or even 60° to the ground.

With respect to FIGS. 4a and 4b, a characteristic pattern of a conventional milling edge 12k determined using the optical detector 10 will be discussed.

Figure 4A:
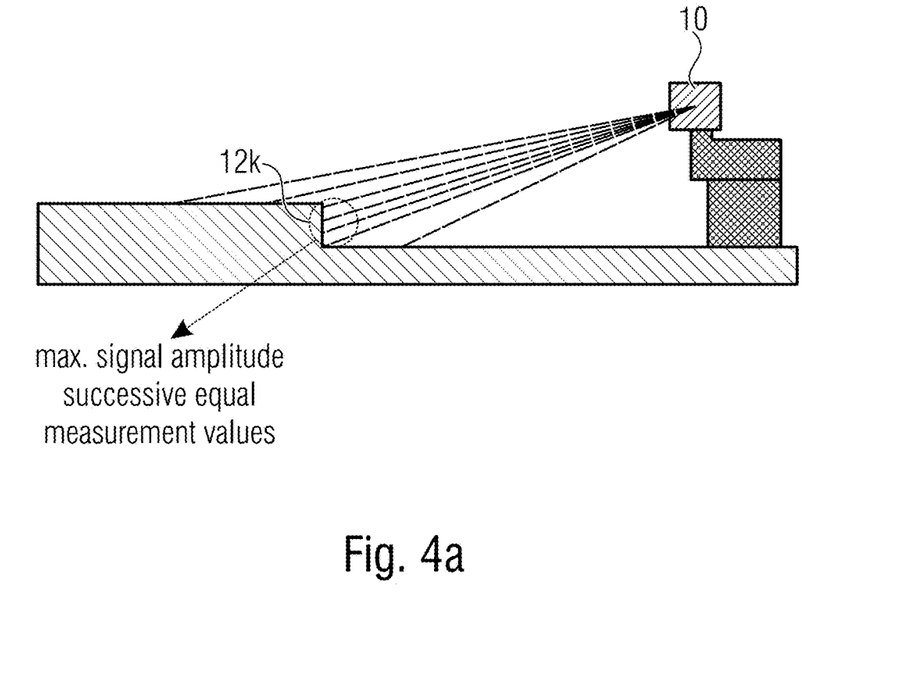
FIGS. 4a-4e show schematically different measurement situations together with respective measurement results to illustrate embodiments.
Figure 4B:
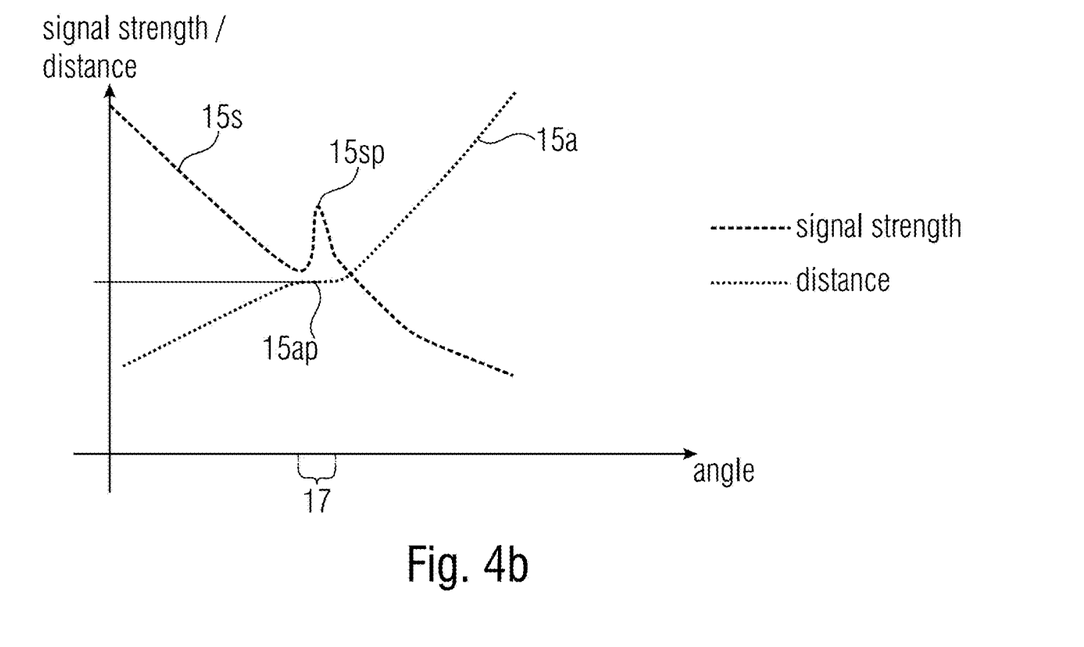

FIG. 4a illustrates the pattern recognition of a milling edge 54k by means of the laser scanner 10 from the side. For example, the laser scanner 10 again scans with a scanning range of 15 to 45 degrees or of 15 to 30 degrees.

The milling edge 54k also provides a special pattern which can be used to unambiguously determine the distance to the milling edge 54k. This is to be explained in FIG. 4b such that the pattern of the milling edge can be detected across successive identical measurement values with a relatively high signal amplitude. Looking at the waveforms of the signal strength 15s and the measurement distance 15a shown in FIG. 4b, the special pattern recognition of the waveforms becomes clear. A corresponding detection or evaluation algorithm detects the slight superelevation of the signal strength 15sp in the scanning range 17, which represents the measurement angle for the milling edge 54h. Additionally or alternatively, the evaluation algorithm can also detect approximately equal distance values 15a in this scanning range 17. In this respect, therefore, the pattern recognition of a milling edge from the side consists of detecting a lateral superelevation (cf. reference number 15s) as in the case of the signal strength and/or a plateau 15ap for the distance measurement value 15a, wherein 15sp and 15ap occur essentially in the same measurement range/angular range 17. The plateau 15ap also simultaneously represents the measurement distance to the milling edge to be evaluated.

Figure 4C:
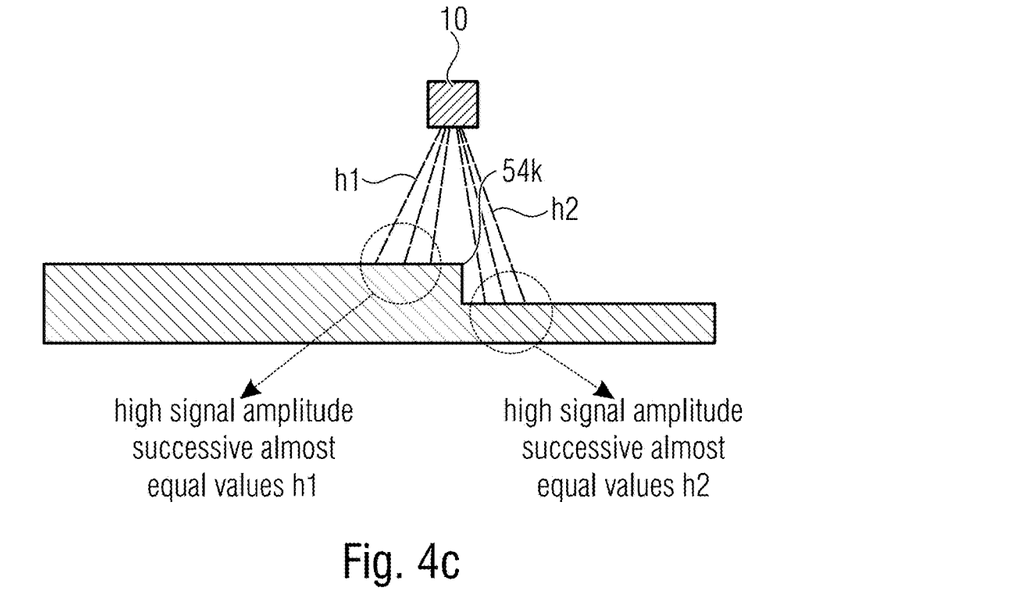

FIG. 4c shows the same edge 12k but from a different point of view, namely the point of view where the optical detector 10 is not inclined with respect to the ground, like what is shown in FIGS. 4a and 3, but directed perpendicular to the ground.

Figure 4D:
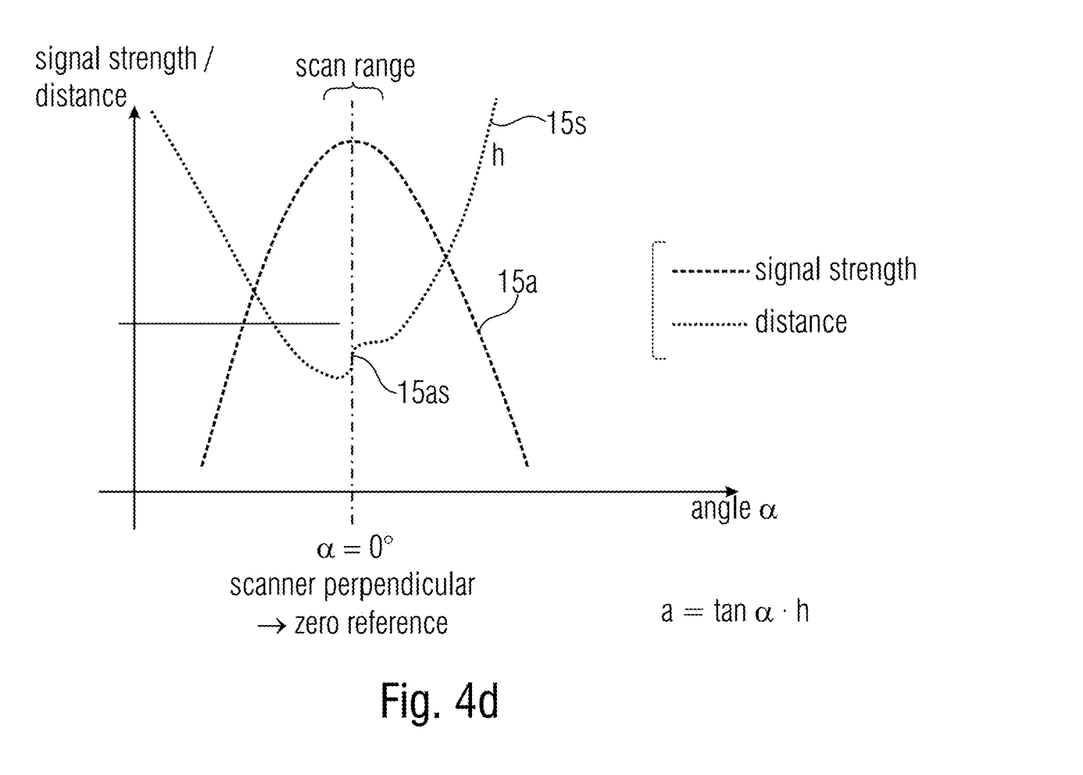
Figure 4E:
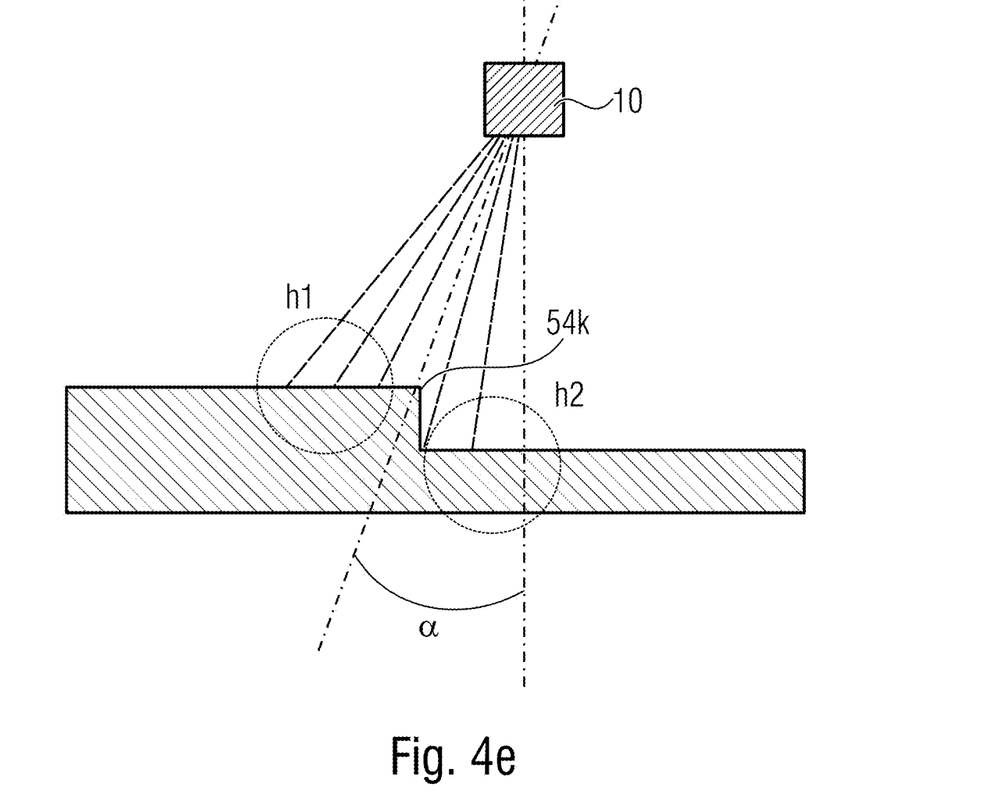

Referring to FIG. 4c, the pattern recognition of a milling edge 54k from above is explained. For this purpose, the laser scanner 10 is arranged above the milling edge 54k. The resulting waveform is shown in FIG. 4d. As can be seen from FIG. 4d, evaluation of the milling edge 54k from above results in a relatively large scan angle (e.g. 30° to) 50° of measurement values to the signal strength 15s and to the measurement distance 15a with high signal amplitude. At signal strength 15s, there is a measurement value jump 15ss from h1 to h2 at the position of the milling edge. This jump provides the exact position of the milling edge in relation to the measurement angle (here: α=0 degrees). Decisive in addition to the distance values is the scan angle at which the height jump from h1 to h2 occurs. The distance measurement is used here only to detect the change in distance from h1 to h2. Assuming that the angle α=0 degrees or any angle in the measurement range is taken as the reference value, it is not the distance but the scan angle at which the height jump occurs that has to be kept constant in this application. According to an alternative, the scan angle can also be converted into a distance value (lateral or vertical distance), as can be seen from FIGS. 4d and 4e. In FIG. 4e, the situation of FIG. 4c is shown, wherein, however, the scanner 10 is not arranged vertically above, but laterally offset with respect to the milling edge 54k. Thus, an angle α (angle of the jump) is established. Based on the formula a=tan (α)·h with a equal to the distance and h equal to the height (cf. FIG. 4d), the lateral distance can be determined.

The signal pattern from FIG. 4d is relevant for the distance calculation to the reference. If the laser scanner 10 is perpendicular above the milling edge 54s, the zero reference is defined here, i.e. the measurement angle has the value α=0 degrees at this location. If the laser scanner 10 is not perpendicular to the reference (here milling edge 54k with offset to the top right), the measurement angle α changes in relation to the zero reference. The measurement distance to the reference can therefore be calculated in the same way as the tangent value, so that the distance value a determined in this way in the X direction (lateral) represents the distance to the zero reference. While the zero reference is determined in the laser scanner, the laser scanner 10 should be installed during setup so that the distance value a is as close to zero as possible.

FIG. 4e show another point of view where the sensor 10 is likely inclined with respect to the edge 12k.

The above discussion has shown that the pattern of height and/or intensity values can differ with respect to the angle formed between the edge to be detected and the detector.

As discussed above, the entity 20 is configured to detect the type of the edge by use of the measurement data/LiDAR measurement data. Based on this data, the geometry of the edge can be calculated, wherein typically a geometry is directly assigned to an edge type, like the curb stone edge, paving edge or milling edge.

According to further embodiments, the quality of the formed edge can be determined. Since the measurement is performed during subsequent points of time during which the construction machine travels along the traveling direction, different positions of the edge are scanned. This enables that deviations from the current geometry can be determined. Furthermore, interactions of the edge can be determined. According to embodiments, different predetermined patterns for different quality levels of one edge type can be used so as to determine the quality by use of a predetermined pattern.

According to an embodiment, the entity 20 is configured to automatically detect the edge type and outputs an information to another entity, like the edge detector which monitors a spacing between the road construction machine and the edge. For this, a control point, like the edge itself, it set so that this control point can be continuously monitored during traveling along the traveling direction. For example, when assuming a milling edge, like the milling edge as shown by FIG. 2a, the control point can be set aligned with the edge. However, in case the edge does not comprise a perpendicular slope but a flat slope, like 70° or less, the control point, according to further embodiments, can be adjusted, e.g., by the user. This is illustrated by FIGS. 2c and 2d. In FIG. 2c, two potential control points to be set are shown while FIG. 2d shows three potential control points. Of course, further control points in between can be set as well. This means that the control point is adjustable to the shown positions or between the shown positions. According to embodiments, the control point can be set during an initial starting phase. For example, when an edge type is determined the user may be asked to set the control point or confirm the control point which was automatically set by the controller 20.

According to further embodiments, the controller 20 is configured to learn different edge types or learn one edge type scanned from different positions. This learning phase may be done using artificial intelligence. For example, label training data may be used to learn the different types of edges. Additionally or alternatively, an edge may be scanned as training data, wherein the operator inputs a label regarding the edge type.

In the following, additional embodiments and aspects of the invention will be described which can be used individually or in combination with any of the features and functionalities and details described herein.

According to a first aspect, a sensor system for a construction machine 50, especially a road construction machine 50 or paving machine, comprises optical detector 10 which is arrangeable on the construction machine 50 and configured to scan the underground in a predetermined angle so as to obtain measurement data describing one or more intensity values 15s and/or one or more distance values 15a plotted over the predetermined angle; a processor 20 which is configured to analyse the measurement data so as to determine a pattern of intensity values 15s and/or distance values 15a in accordance with a predetermined pattern out of one or more predetermined patterns.

According to a second aspect when referring back to the first aspect, the optical detector 10 is configured to scan the underground to be paved or paved across a travelling direction of the construction machine 50 and/or angled by an angle in the range between 45° and 90° with respect to the traveling direction of the construction machine 50.

According to a third aspect when referring back to any one of the first and second aspects, the optical detector 10 is configured to scan the underground to be paved or paved along a direction crossing the traveling direction of the construction machine 50 and/or along a plurality of positions along the traveling direction of the construction machine 50.

According to a fourth aspect when referring back to any one of the first to third aspects, the one or more predetermined patterns comprises a milling edge 12k pattern characterized by two plateaus with a connection in between, wherein the connection is substantially perpendicular to the two plateaus or having an inclination angle within a range between 70° to 90°.

According to a fifth aspect when referring back to any one of the first to fourth aspects, the one or more predetermined pattern comprises a paving edge 12k pattern characterized by two plateaus having a connection in between, wherein the connection has an inclination angle of less than 70°.

According to a sixth aspect when referring back to any one of the first to fifth aspects, the one or more predetermined patterns comprise a curb stone edge 12k pattern characterized by two plateaus having a connection in between or a substantially perpendicular connection in between, wherein one edge 12k comprises a roundness and/or wherein the spacing between the two edges 12k is larger than 5 cm or 10 cm [approx.].

According to a seventh aspect when referring back to any one of the first to sixth aspects, the optical detector 10 comprises a LIDAR sensor and/or laser scanner.

According to an eighth aspect when referring back to any one of the first to seventh aspects, the controller is configured to set and/or determine a control point in relation to the pattern or a curb within the pattern or in relation to a user determinable spacing to the curb within the pattern.

According to a ninth aspect when referring back to any one of the first to eighth aspects, the processor 20 is configured to determine the pattern within a plurality of measurement data determined along a traveling direction and/or during a plurality of subsequent point of times; and/or wherein the processor 20 is configured to track a control point determined within the pattern along the traveling direction and/or along a plurality of measurements determined in a plurality of subsequent points of time.

According to a tenth aspect when referring back to any one of the first to ninth aspects, the processor 20 is configured to perform a predetermination of one or more patterns during a teach in phase and/or during a training phase and/or during a training phase performed using artificial intelligence.

According to an eleventh aspect when referring back to any one of the first to a tenth aspects, the processor 20 is configured to automatically determine a control point and/or a relation or lateral spacing to the control point or between the control point and the construction machine 50 and/or to output an information on the spacing or lateral spacing to a control point of the construction machine 50.

According to a twelfth aspect, a construction machine 50, especially work construction machine 50 or paving machine comprises a sensor system according to one of the previous aspects.

According to a thirteenth aspect when referring back to the twelfth aspects, the construction machine 50 comprises a controller for performing autonomous, semiautonomous and/or automated controlling based on measurement data provided by the sensor system.

According to a fourteenth aspect, a method for performing a curb detection using a sensor system for a construction machine 50, especially a road construction machine 50 or paving machine, comprises the following steps: scanning the underground in a predetermined angle so as to obtain measurement data describing one or more intensity values 15s and/or one or more distance values 15a plotted over the predetermined angles; analysing the measurement data so as to determine a pattern of intensity values 15s and/or distance values 15a in accordance with a predetermined pattern out of one or more predetermined patterns.

A fifteenth aspect relates to a computer program for performing, when running on a controller of a construction machine 50, the steps of the method according to the fourteenth aspect.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Sensor system for a construction machine, especially a road construction machine or paving machine, comprising:
    optical detector which is arrangeable on the construction machine and configured to scan the underground in a predetermined angle to the side so as to acquire measurement data describing one or more intensity values and one or more distance values plotted over the predetermined angle;
    a processor which is configured to analyse the measurement data so as to determine a pattern of intensity values and distance values in accordance with a predetermined pattern out of more predetermined patterns;
    wherein the one or more predetermined patterns comprising a milling edge pattern comprising two plateaus with a connection in between, wherein the connection is substantially perpendicular to the two plateaus or comprising an inclination angle within a range between 70° to 90°; and
    wherein the one or more predetermined pattern comprises a paving edge pattern comprising two plateaus comprising a connection in between, wherein the connection comprises an inclination angle of less than 70°; and
    wherein the one or more predetermined patterns comprise a curb stone edge pattern comprising two plateaus comprising a connection in between or a substantially perpendicular connection in between, wherein one edge comprises a roundness and/or wherein the spacing between the two edges is larger than 5 cm or 10 cm.

2. Sensor system according to claim 1, wherein the optical detector is configured to scan the underground to be paved or paved across a travelling direction of the construction machine and/or angled by an angle in the range between 45° and 90° with respect to the traveling direction of the construction machine.

3. Sensor system according to claim 1, wherein the optical detector is configured to scan the underground to be paved or paved along a direction crossing the traveling direction of the construction machine and/or along a plurality of positions along the traveling direction of the construction machine.

4. Sensor system according to claim 1, wherein the optical detector comprises a LIDAR sensor and/or laser scanner.

5. Sensor system according to claim 1, wherein the processor is configured to determine a control point in relation to the pattern, especially in relation to a curb within the pattern or in relation to a user determinable spacing to the curb within the pattern; or
wherein the processor is configured to set a control point in relation to the pattern, especially in relation to a curb within the pattern or in relation to a user determinable spacing to the curb within the pattern; or
wherein the processor is configured to determine and set a control point in relation to the pattern, especially in relation to a curb within the pattern or in relation to a user determinable spacing to the curb within the pattern.

6. Sensor system according to claim 1, wherein the processor is configured to determine the pattern within a plurality of measurement data determined along a traveling direction and/or during a plurality of subsequent point of times; and/or
wherein the processor is configured to track a control point determined within the pattern along the traveling direction and/or along a plurality of measurements determined in a plurality of subsequent points of time.

7. Sensor system according to claim 1, wherein the processor is configured to perform a predetermination of one or more patterns during a teach in phase and/or during a training phase and/or during a training phase performed using artificial intelligence.

8. Sensor system according to claim 1, wherein the processor is configured to automatically determine a control point of the construction machine, especially a relation or lateral spacing to the control point or a relation or lateral spacing between the control point and the construction machine; or
wherein the processor is configured to output an information on a spacing or lateral spacing to a control point of the construction machine; or
wherein the processor is configured to automatically determine a relation or lateral spacing to a control point of the construction machine and to output an information on a spacing or lateral spacing to a control point.

9. Construction machine, especially work construction machine or paving machine comprising a sensor system according to claim 1.

10. Construction machine according to claim 9, wherein the construction machine comprises a controller for performing autonomous, semiautonomous and/or automated controlling based on measurement data provided by the sensor system.

11. Method for performing a curb detection using a sensor system for a construction machine, especially a road construction machine or paving machine, comprising:
scanning the underground in a predetermined angle to the side so as to acquire measurement data describing one or more intensity values and one or more distance values plotted over the predetermined angles;
analysing the measurement data so as to determine a pattern of intensity values and distance values in accordance with a predetermined pattern out of more predetermined patterns;
wherein the one or more predetermined patterns comprising a milling edge pattern characterized by two plateaus with a connection in between, wherein the connection is substantially perpendicular to the two plateaus or comprising an inclination angle within a range between 70° to 90°; and
wherein the one or more predetermined pattern comprises a paving edge pattern characterized by two plateaus comprising a connection in between, wherein the connection comprises an inclination angle of less than 70°; and
wherein the one or more predetermined patterns comprise a curb stone edge pattern characterized by two plateaus comprising a connection in between or a substantially perpendicular connection in between, wherein one edge comprises a roundness and/or wherein the spacing between the two edges is larger than 5 cm or 10 cm.

12. A non-transitory digital storage medium having a computer program stored thereon to perform the method for performing a curb detection using a sensor system for a construction machine, especially a road construction machine or paving machine, the method comprising:
scanning the underground in a predetermined angle to the side so as to acquire measurement data describing one or more intensity values and one or more distance values plotted over the predetermined angles;
analysing the measurement data so as to determine a pattern of intensity values and distance values in accordance with a predetermined pattern out of more predetermined patterns;
wherein the one or more predetermined patterns comprising a milling edge pattern characterized by two plateaus with a connection in between, wherein the connection is substantially perpendicular to the two plateaus or comprising an inclination angle within a range between 70° to 90°; and
wherein the one or more predetermined pattern comprises a paving edge pattern characterized by two plateaus comprising a connection in between, wherein the connection comprises an inclination angle of less than 70°; and
wherein the one or more predetermined patterns comprise a curb stone edge pattern characterized by two plateaus comprising a connection in between or a substantially perpendicular connection in between, wherein one edge comprises a roundness and/or wherein the spacing between the two edges is larger than 5 cm or 10 cm, when said computer program is run by a computer.

* * * * *